Sept. 8, 1953 P. J. CORSO ET AL 2,651,234
OUTDOOR PICTURE PROJECTION SCREEN APPARATUS
Filed Nov. 24, 1948 2 Sheets-Sheet 1
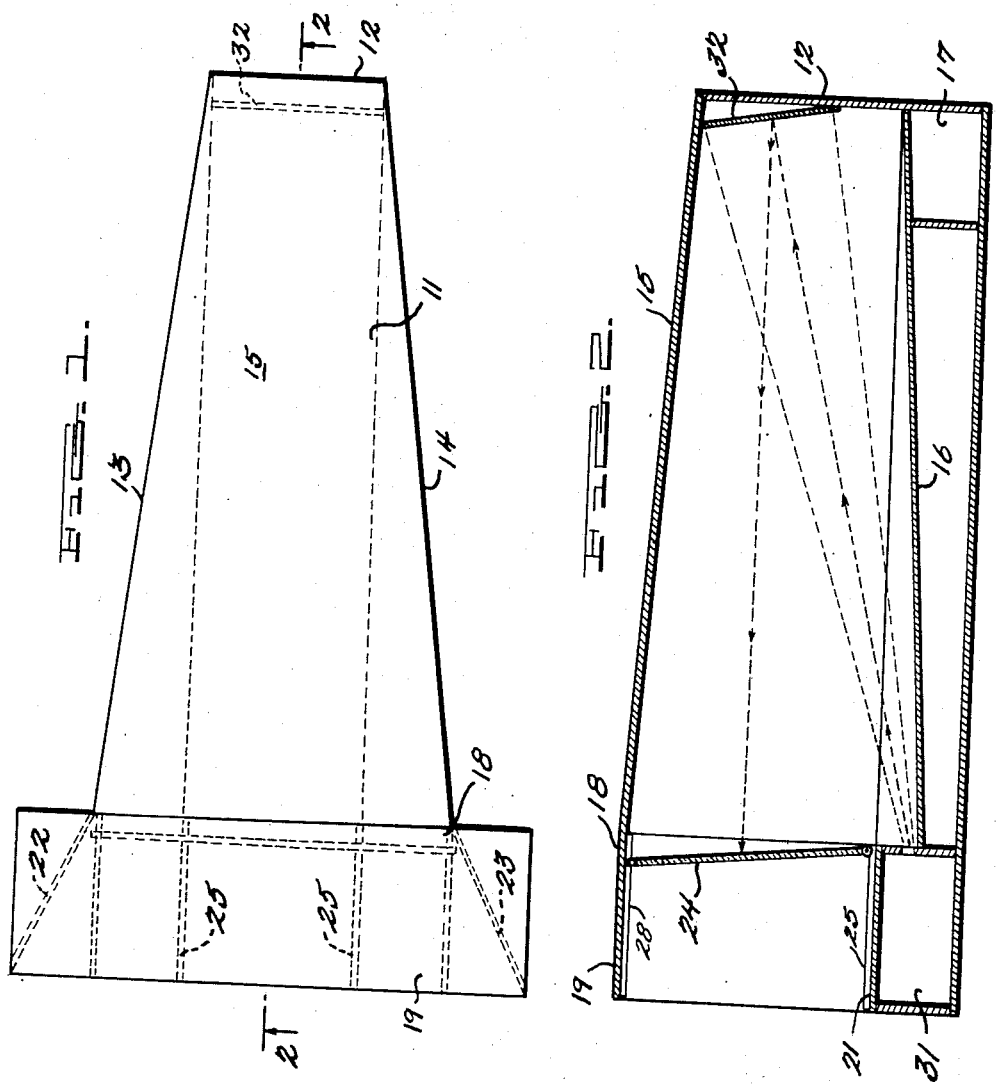
INVENTORS
PHILIP J. CORSO
BY PASQUALE A. ROMANO
Church & Church
ATTORNEYS Sept. 8, 1953 P. J. CORSO ET AL 2,651,234
OUTDOOR PICTURE PROJECTION SCREEN APPARATUS
Filed Nov. 24, 1948 2 Sheets-Sheet 2
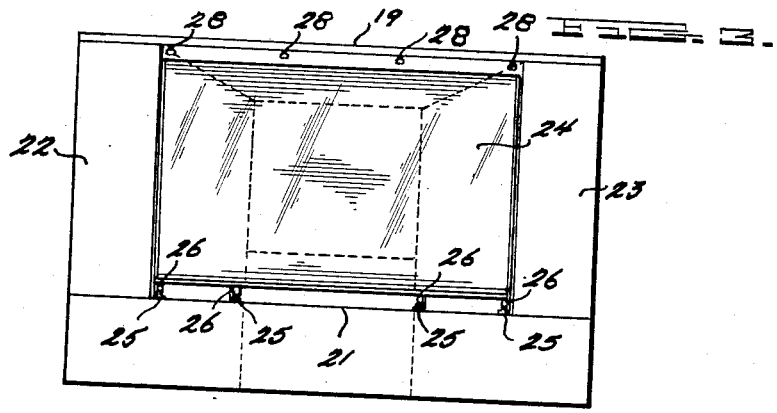
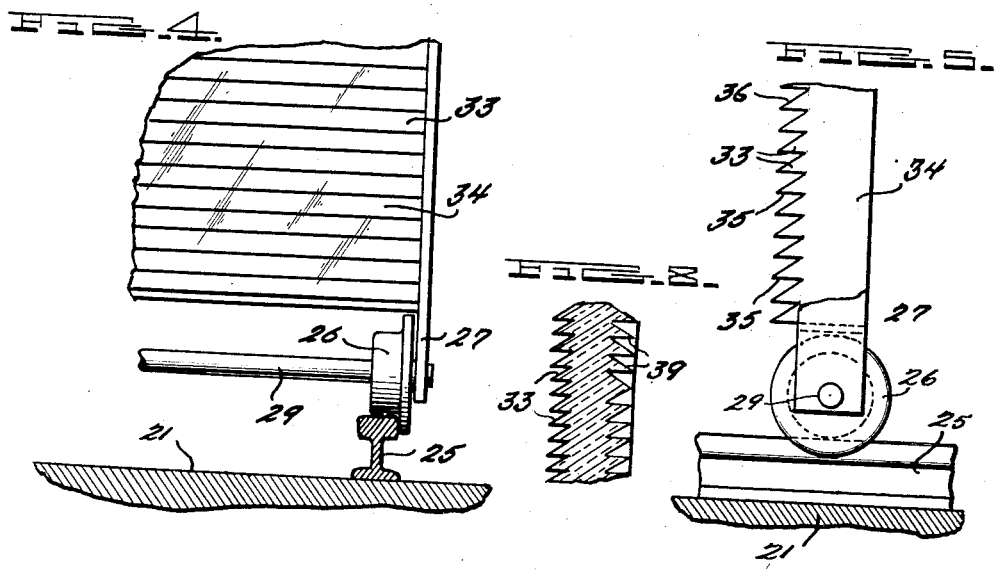
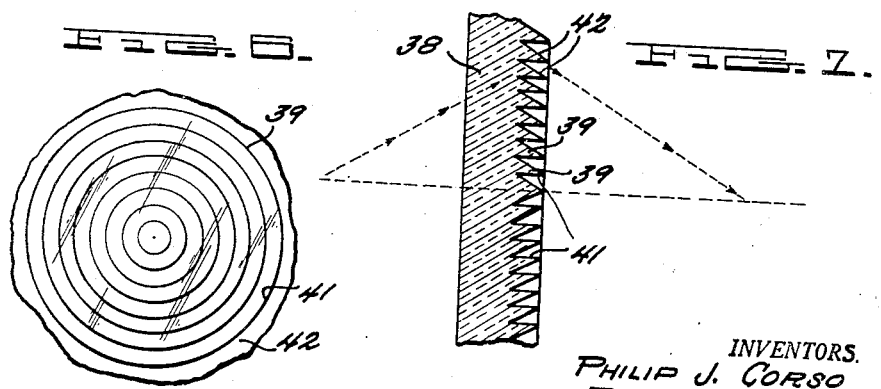
INVENTORS.
PHILIP J. CORSO
BY PASQUALE A. ROMANO
Church & Church
ATTORNEYS Patented Sept. 8, 1953

2,651,234

UNITED STATES PATENT OFFICE 2,651,234

OUTDOOR PICTURE PROJECTION SCREEN APPARATUS

Philip J. Corso, California, and Pasquale A. Romano, Philadelphia, Pa.

Application November 24, 1948, Serial No. 61,854

2 Claims. (Cl. 88—24)

This invention relates to outdoor motion picture apparatus and particularly concerns such apparatus which may be effectively used in daylight.

Efforts to project outdoor motion pictures during daylight have encountered two major difficulties. First, a screen directly exposed to daylight cannot produce a distinct image because the daylight eliminates the shadows which define an image projected on the screen. While some success may be obtained by shielding the screen from external light, this can only be accomplished by substantially reducing the angle from which an image on the screen may be viewed and thereby reducing the capacity of the theater.

Another difficulty encountered is the loss of projected light by diffusion on the screen. By reducing the screen losses the proportion of external light may be increased without destroying definition of the image on the screen. Some attempts have heretofore been made to utilize translucent screens and project the image onto the rear of the screen. However, translucent screens are subject to considerable light loss and, the image from a standard film in a standard motion picture projector is reversed when viewed from the front of a rear projection screen.

A major object of this invention is to overcome these difficulties of projecting motion pictures during daylight by providing outdoor motion picture projection apparatus which may be viewed during daylight and will retain the desirable features of present projectors when used after dark.

More particularly, an object of the invention is to increase the efficiency of a translucent screen for use in outdoor motion picture theaters.

Another specific object of the invention is to shield the screen from external light during daylight without curtailing the after dark capacity of the theater.

Still another object is to provide projection apparatus utilizing a standard projector and standard film wherein the image projected onto the rear face of a translucent screen, when viewed from the front of the translucent screen corresponds to the image which would be projected directly onto the front of the screen.

In accordance with these objects, one important feature of the invention resides in the arrangement of symmetrical ridges projecting from one face of the translucent screen to increase the light transmission efficiency of the screen. Another feature of the invention resides in the support of the screen for movement in a light shield according to the intensity of external light. An important feature of the invention is also found in the projection system whereby an image bearing beam is reflected onto the rear face of a translucent screen to produce an image which when viewed from the front of the translucent screen corresponds to the image which would be projected by a standard projector onto the front of the screen.

Other objects and advantages of the invention may be found in the following specification taken in connection with the accompanying drawings wherein Figure 1 is a top plan view of outdoor motion picture projection apparatus embodying the invention in its preferred form;

Fig. 2 is a vertical section taken on the line 2—2 of Fig. 1;

Fig. 3 is a front elevation of the apparatus shown in Fig. 1;

Fig. 4 is a partial vertical section on an enlarged scale and showing a fragment of the screen together with the movable support therefor;

Fig. 5 is a partial sectional view of the subject-matter of Fig. 4;

Fig. 6 is a fragmentary elevation of a screen embodying a modified form of the invention;

Fig. 7 is a partial sectional view of the screen shown in Fig. 6; and

Fig. 8 is a partial sectional view of another modified form of screen.

In accordance with the invention in its preferred form, the projection apparatus includes a light-tight housing having side walls tapering rearwardly toward each other and provided, at its front ends, with a light shield surrounding a translucent screen and having diverging side walls extending forwardly from the housing. A projector at the front end of the housing directs an image bearing beam onto a reflector at the rear end of the housing which reflects the beam on the translucent screen. The screen is movable longitudinally of the shield so, during daylight, it may be positioned so it is shadowed by the shield, and as the intensity of external light decreases, it may be moved forwardly thereby increasing the horizontal angle from which an image on the screen may be viewed. To increase the light transmission efficiency of the translucent screen, either one or both of its faces are provided with symmetrically arranged prismatic ridges which reduce diffusion by collecting and guiding the light rays toward the viewing surface of the screen.

Referring now to the accompanying drawings, a light-tight housing or building 11 is closed at its rear end by a rear wall 12 and has side walls 13 and 14 tapering toward each other and covered by a roof 15 which may be level or may slope downwardly toward the rear wall 12. To enclose the bottom of the light-tight housing an upwardly sloping floor 16 extends from the front of the housing upwardly to the rear wall 12. The chamber below the rear portion of the floor 16 may be suitably used as a ticket office, as represented at 17. For purposes of illustration, and without being limited to specific dimensions, the building or housing may be about ninety feet long and the rear wall 12 about twenty-one feet wide. With the side walls 13 and 14 arranged at an appropriate angle relative to each other, the width of the front of the housing at point 18 will be about forty-four feet. At the front end of the light-tight housing there is provided a light shield having a horizontal roof 19 and a horizontal floor 21 with side walls 22 and 23 diverging forwardly at an angle of about 30° from their connection to the housing. Within this light shield there is arranged a translucent screen 24 slidable longitudinally with respect to the housing and the light shield. One arrangement for providing movement of the screen includes the arrangement of several parallel rails 25, 25, on the floor 21 of the light shield and extending parallel to the longitudinal axis of the housing. The screen 24 is carried by a plurality of wheels 26, 26, secured to the screen as by a bracket 27 (Fig. 4). The wheels 26 ride on the rails 25 so the screen may be shifted back and forth within the light shield. To steady the screen 24, a series of guides 28, 28, on the roof 19 of the light shield engage corresponding slots in the top of the screen. Furthermore, the screen 24 may be arranged to pivot slightly about axle 29 for the wheels 26 so it may be inclined forwardly 5° with respect to the vertical.

The width of the screen may vary from forty to fifty-two feet and the height is preferably between thirty and thirty-nine feet.

Depending upon the intensity of external light, the screen is positioned at a selected point longitudinally of the light shield, for example, when the external light has an intensity of 50 lumens, the screen will be moved to the rearmost part of the light shield. When the intensity of the light falls to 10 lumens or below, the screen may be positioned at the forwardmost point of the light shield. Intermediate positions of the screen are selected in proportion to the intensity of external light. In its preferred form, the light shield is about thirty-two feet high and twenty feet deep. The width at the narrow end corresponds to the width of the front end of the light-tight housing which may be forty-four feet. The maximum width of the light shield, that is, at its forwardmost end, is about sixty-four feet, with the diverging side walls 22 and 23 arranged at angles of about 30° with respect to the longitudinal axis of the housing.

Beneath the floor 21 for the light shield, there is arranged a projection room 31 containing a standard motion picture projector. This projector directs an image bearing light beam rearwardly of the light-tight chamber onto a reflector 32 which is arranged at an angle with respect to the vertical so it directs the image bearing light beam onto the rear face of the translucent screen 24. For most transmissions, the reflector 32 will be arranged at an angle of about 10° with respect to the vertical.

This projection arrangement is such that the image projected onto the screen 24, when viewed from the front of the screen, corresponds to an image which would be directed onto the front of the screen by a standard projector. The use of the reflected path for the image bearing light beam not only reduces the distance normally required between the projector and the screen, but, in addition, corrects the transposition of the image which would be present where the projector is directed toward the rear face of the screen.

The screen 24 may be formed of any suitable translucent material such as ground glass or sand blasted celluloid. Normally, such screens diffuse the light to such an extent that only a small fraction is visible to the eye through the screen. To improve the light-flux efficiency, that is, to increase the light transmission efficiency of the screen, the surface is preferably provided with a series of symmetrically arranged prismatic ridges such as the horizontal prismatic ridges 33, 33, shown in Figs. 4 and 5. These ridges 33, 33, provide a translucent screen composed of a main sheet of translucent material 34, having on at least one of its faces prismatic corrugated indentations. In the embodiment shown in Figs. 4 and 5, the prismatic ridges 33, 33, preferably have their lower faces 35, 35, horizontally arranged and extending across the entire face of the sheet 34 forming the translucent screen. To effect the prismatic formation of these ridges, their outer faces extend upwardly and inwardly from the front of one of the bottom surfaces 35 to the rear of the surface 35 immediately above. This arrangement, by reflecting the diffused beams collects and guides them toward the eye of a person viewing the image from the front of the screen. Thus, the screen has a sheet of translucent material with one face formed of symmetrically arranged prismatic ridges. In the form of the invention shown in Figs. 4 and 5, these ridges extend horizontally across the front face of the screen and have their horizontal bottom surfaces 35 connected by rearwardly and upwardly sloping top surfaces 36, 36.

Another form of symmetrically arranged prismatic ridges or prismatic corrugated indentations is illustrated in Figs. 6 and 7. In these figures the prismatic ridges are of circular formation concentrically arranged on the face of the screen. The screen has a main body 38 of translucent material with one face formed with prismatic circular ridges 39, 39, having their inner peripheries 41, 41, substantially normal to the sheet material 38, and their outer peripheries 42, 42, sloping outwardly toward the sheet material so the sloping peripheral surfaces 42, 42, connect the surfaces 41, 41, which are perpendicular to the plane of the screen.

These concentrically arranged circular prismatic ridges focus the light rays in a manner similar to the focusing accomplished by a Fresnel lens.

The amount of concentrated light at the outer viewing surface of the translucent screen depends, of course, upon the material of which the screen is constructed and, also, upon the chosen angle of the sloping sides of the primatic ridges. From the angle of these sloping sides, and the length of the sides, a certain focal length may be derived. This angle and the distance between corrugated elements determines a prismatic constant for the screen. This constant is important in that, when the angle and the distance are correctly arranged, the corrugated indentations of the screen are obscured from the eyes of the viewer. Preferably the distances between corrugated indentations vary between 0.2 mm. and 2.0 mm.

The prismatic corrugated indentations or ridges may be applied by embossing or cutting, or by superimposing ridges of the same material from which the screen is made.

In some installations, it may be desirable to provide symmetrically arranged prismatic ridges on both the front and back surfaces of the screen, as illustrated in Fig. 8, where the front surface has horizontally disposed ridges such as the ridges 33 and the back surface has concentrically arranged circular ridges such as the ridges 39.

The screen may be slightly concave toward the side facing the reversing reflector 32. This concave construction should approach zero degrees as its purpose is to collect the light rays more efficiently and to eliminate distortion of the image as viewed from the forward side of the screen.

From the foregoing description it will be apparent that the overall distance for the projection path is reduced by approximately half by reflecting the image bearing beam from the projector onto the screen. Thus, the overall length of the housing may be one-half that normally required for straight line projection. Furthermore, the use of the reflector 32 produces a correct image as viewed from the forward side of the screen 33, whereas a reversed image is produced by straight line projection through a translucent screen.

During daytime projection, when the external light has a high intensity, the screen is moved along rails 25, 25, to ts rearmost position where it is well shielded by the top 19 and the diverging walls 22 and 23 of the light shield. However, when in this position, the image on the screen may be viewed only within an angle of about 60°, corresponding to the included angle of the diverging side walls 22 and 23. To increase this angle of view, and thereby increase the capacity of the outdoor theater, when the external light intensity decreases, the screen is moved forwardly in proportion to the intensity of the light until, in darkness, the screen may be at its forwardmost position where the view is complete from all angles within the outdoor theater.

The improved efficiency of the translucent screen having symmetrical prismatic corrugations on one or both surfaces provides a better image on the viewing surface of the screen and one which may be observed in the presence of external light.

What is claimed is:

1. In motion picture projection apparatus for an outdoor theater, a translucent screen, a light shield surrounding said screen having side walls diverging outwardly away from said screen, a track extending longitudinally of said light shield, and roller means supporting said screen on said track for moving said screen longitudinally of said shield to adjust the exposure of said screen and to adjust the horizontal angle of the field of view of said screen according to changes in the intensity of external light.

2. In motion picture projection apparatus for an outdoor theater, a translucent screen, a light shield surrounding said screen having side walls diverging outwardly away from said screen, a track extending longitudinally of said light shield, roller means supporting said screen on said track for moving said screen longitudinally of said shield to adjust the exposure of said screen and to adjust the horizontal angle of the field of view of said screen according to changes in the intensity of external light, and means for projecting an image bearing beam on the rear face of said screen.

PHILIP J. CORSO.
PASQUALE A. ROMANO.

References Cited in the file of this patent

UNITED STATES PATENTS

| Number | Name | Date |
| --- | --- | --- |
| 755,196 | Wadsworth | Mar. 22, 1904 |
| 1,260,221 | McCormick | Mar. 19, 1918 |
| 1,332,413 | Robertson | Mar. 2, 1920 |
| 1,344,682 | Hernandez | June 29, 1920 |
| 1,419,281 | Macbeth | June 13, 1922 |
| 1,589,493 | Victor | June 22, 1926 |
| 1,791,573 | Parolini | Feb. 10, 1931 |
| 1,840,920 | Spaulding | Jan. 12, 1932 |
| 2,030,505 | Roulet | Feb. 11, 1936 |
| 2,124,587 | Morrissey | July 26, 1938 |
| 2,181,696 | Herrschaft | Nov. 28, 1939 |
| 2,200,646 | Strong et al. | May 14, 1940 |
| 2,207,835 | Sukumlyn | July 16, 1940 |
| 2,231,395 | Schlegel | Feb. 11, 1941 |
| 2,279,555 | Browne et al. | Apr. 14, 1942 |
| 2,313,947 | Klinkum | Mar. 16, 1943 |
| 2,396,251 | Colley | Mar. 12, 1946 |

FOREIGN PATENTS

| Number | Country | Date |
| --- | --- | --- |
| 24,917 | Great Britain | of 1911 |